United States Patent

Hall et al.

[11] Patent Number: 5,999,383
[45] Date of Patent: Dec. 7, 1999

[54] ARRANGEMENT FOR DETECTING QUENCHES IN SUPERCONDUCTING COILS

[75] Inventors: David J. Hall; Owen R. Christianson, both of Pittsburgh, Pa.

[73] Assignee: Siemens Westinghouse Power Corporation, Orlando, Fla.

[21] Appl. No.: 09/035,591

[22] Filed: Mar. 5, 1998

[51] Int. Cl.[6] .................................................. H02H 7/00
[52] U.S. Cl. ......................... 361/19; 174/125.1; 505/850
[58] Field of Search ....................... 324/71.6; 174/125.1; 361/19; 505/850, 843

[56] References Cited

U.S. PATENT DOCUMENTS

| | | |
|---|---|---|
| 4,763,404 | 8/1988 | Coffey et al. ............................ 29/599 |
| 4,764,837 | 8/1988 | Jones ........................................ 361/19 |
| 5,168,125 | 12/1992 | Verhaege et al. ................... 174/125.1 |
| 5,278,380 | 1/1994 | Lowry ..................................... 219/635 |

*Primary Examiner*—Jeffrey Gaffin
*Assistant Examiner*—Michael J. Sherry
*Attorney, Agent, or Firm*—Eckert Seamans Cherin & Mellott, LLC

[57] ABSTRACT

A multi-stranded superconducting coil includes compensation windings for use in detection of quenches in the coil. The compensation windings are formed as an integral part of the coil by co-winding a non-superconducting strand along with the superconducting strands in the cable manufacturing process. The non-superconducting strand is cut and electrically connected to the coil at selected locations.

4 Claims, 5 Drawing Sheets

ARRANGEMENT FOR DETECTING QUENCHES IN SUPERCONDUCTING COILS

BACKGROUND OF THE INVENTION

1. Field of the Invention

The invention in general relates to superconducting energy storage inductors and more particularly to a cable arrangement which allows detection of quenches.

2. Description of Related Art

An electrical inductor is capable of storing energy in the magnetic field produced by current flowing through the inductor coil. If the inductor is a superconducting inductor, extremely large amounts of energy can be stored for relatively long periods of time due to the fact that once in the superconducting state, resistance of the inductor winding approaches zero ohms enabling the winding to carry large currents with little loss.

Superconducting magnetic energy storage systems find use in various fields such as industrial, transportation, and defense, as well as in the electrical utility industry.

The inductor winding is comprised of strands of superconducting material, such as niobium-titanium. When in use, the entire inductor is immersed in a cryogenic fluid, such as liquid helium, in order for the coil to maintain its superconductive state. Every superconducting material has a critical temperature above which the material is no longer superconducting.

A quench is said to occur when a region of superconductor loses its superconducting property and becomes a normal resistive conductor. The occurrence of a quench results in localized heating which may cause the quench zone to propagate and lead to severe or catastrophic damage of the coil. Accordingly, means are generally provided for the early detection of such quenches so that the energy stored in the inductor may be dissipated in external resistors, thus preserving the integrity of the inductor so that corrective action may be taken.

Historically, voltage taps, with voltage comparisons, have been the primary means for detecting and localizing incipient quench zones. As will be pointed out, current methods for quench detection require either expensive state of the art amplifiers or expensive and time consuming fabrication techniques.

The present invention allows the quench detection to be accomplished with a significant economic savings.

SUMMARY OF THE INVENTION

An arrangement for use in the detection of quenches in superconducting coils includes a superconducting coil having a plurality of turns of superconducting cable. The superconducting cable is comprised of a plurality of transposed strands at least one of which is a non-superconducting wire, co-wound and integral with the remainder of the strands, which are superconducting. Quench detecting means are connected to selected portions of the cable to detect quenches which may occur between said portions.

DESCRIPTION OF THE PREFERRED EMBODIMENT

Figure 1:
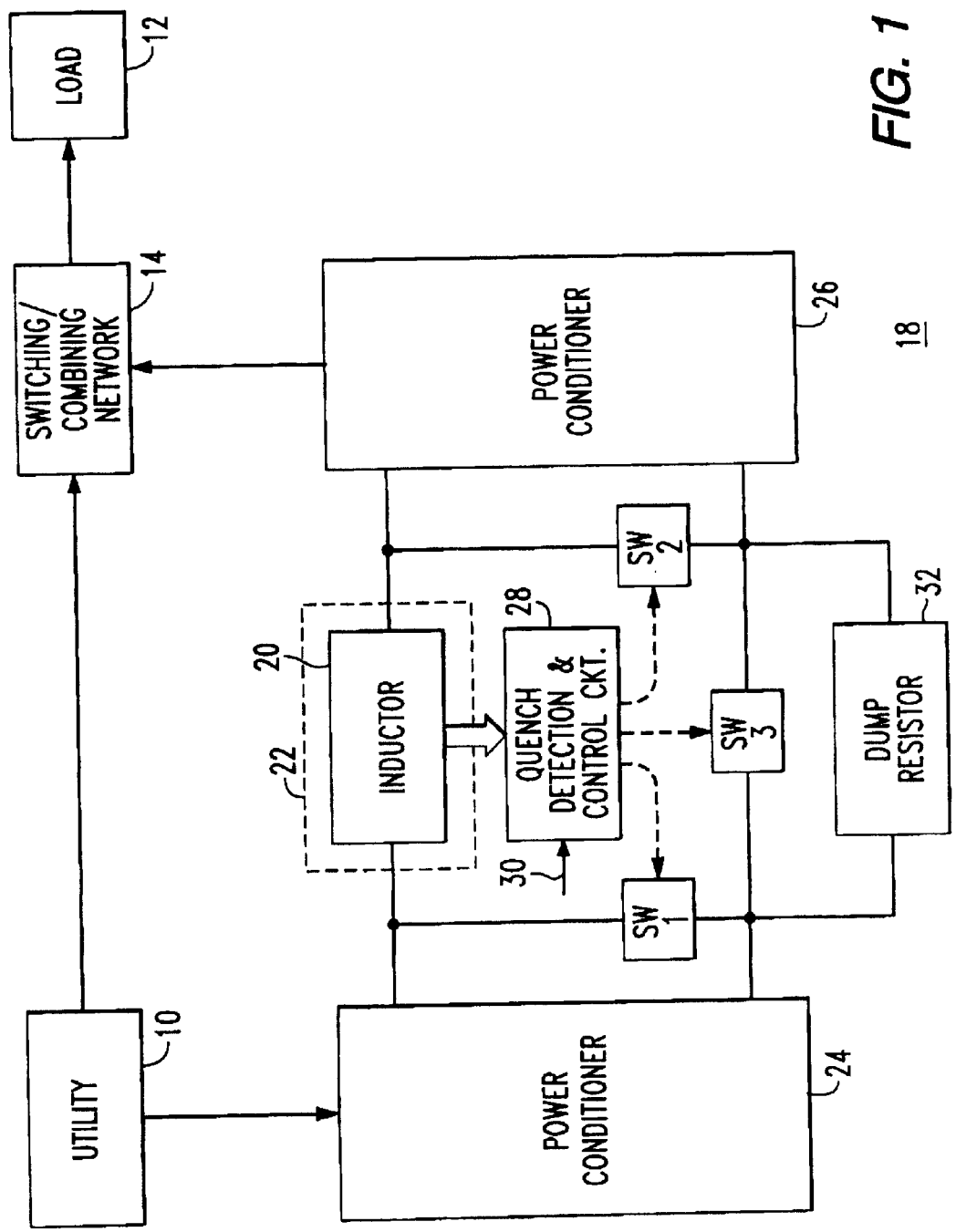
FIG. 1 is a block diagram of one environment in which the present invention is applicable.

In the drawings, which are not necessarily to scale, like or corresponding parts are denoted by like or corresponding reference numerals.

Although the present invention finds use with a variety of systems which utilize superconducting coils (magnets, inductors, solenoids etc.) it will be described by way of example with respect to a superconducting magnetic energy storage system (SMES) for use in the utility industry, as depicted in FIG. 1.

In FIG. 1, a utility 10 provides electric power to a load 12 via a switching/combining network 14. A SMES 18 includes a superconducting inductor 20 which is immersed in a cryogenic fluid within a cryostat 22. Charging current for the inductor 20 is supplied from the utility 10 via a first power conditioning circuit 24 and stored energy from the inductor is returned to the utility grid via a second power conditioning circuit 26 and switching/combining network 14. In addition to supplying energy during power outages, the SMES system may also be used for voltage and frequency control and for augmenting the utility supply, by way of example.

A quench detection and control circuit 28 is responsive to control signals on line 30 from a central control (not illustrated) and is responsive to certain inductor voltage measurements to control operation of a plurality of switches, SW1, SW2 and SW3. During charging of the inductor 20, SW1 is open while SW2 and SW3 are closed. After the charging cycle all of the switches are closed so that the stored current traverses a loop which includes the inductor 20 and switches SW1, SW2 and SW3. For supplying current to the load 12 via power conditioning circuit 26 and switching/combiner network 14, SW1 is closed, SW2 is open and SW3 is closed.

If the quench detection and control circuit 28 detects a quench, all of the stored energy must be dumped in order to protect the inductor 20. This is accomplished by closing switches SW1 and SW2 while opening SW3, thus directing the previously stored current to a dump resistor 30 thereby shunting the energy away from the quench region of the inductor.

Figure 2:
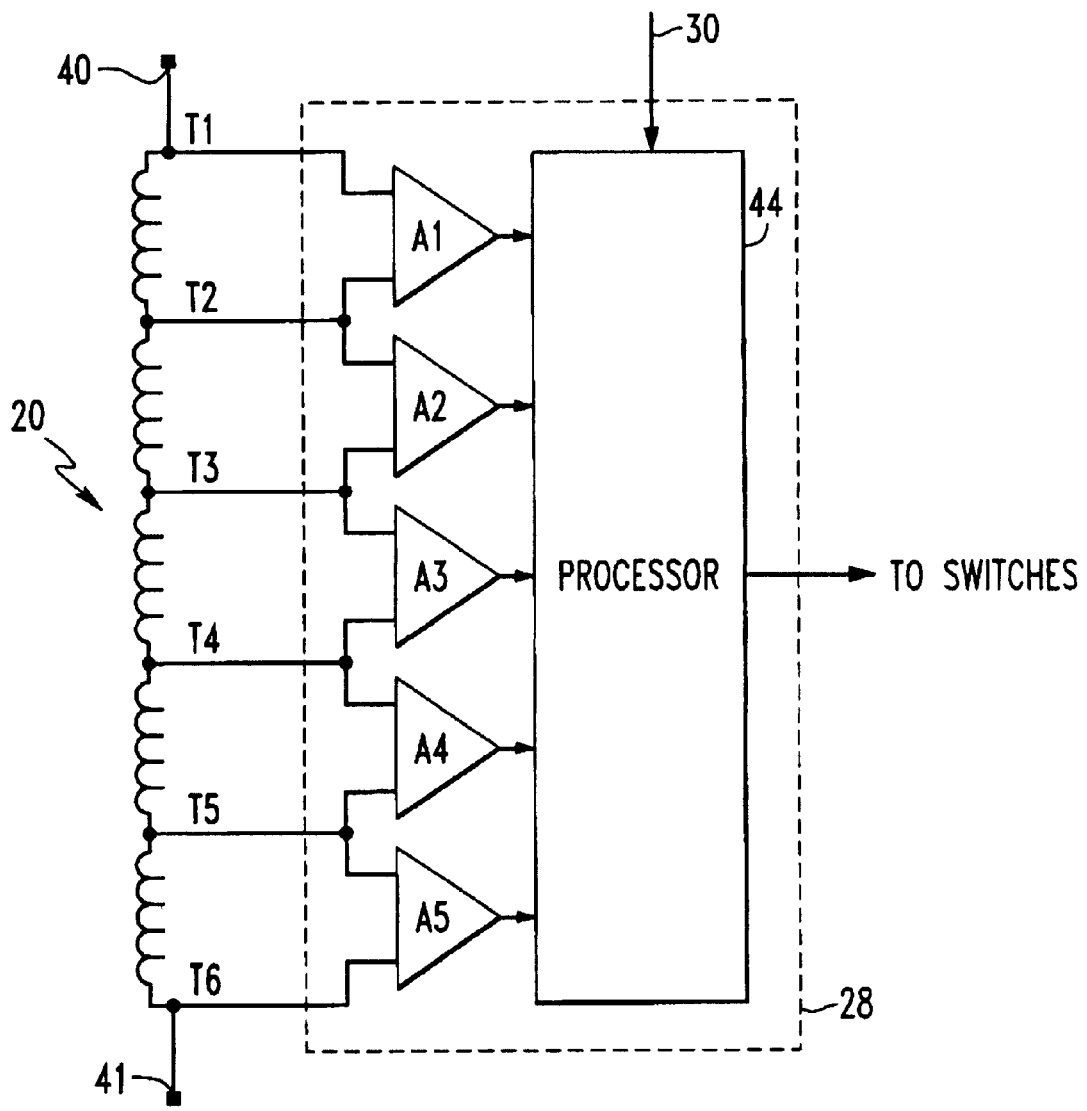
FIG. 2 illustrates one prior art technique for obtaining voltage indications in a quench detection arrangement.

One type of quench detection arrangement is illustrated in FIG. 2. Between one end 40 of the inductor 20 and the other end 41 is a series of taps T1 to T6. During normal charging and discharging operation the superconducting coil exhibits inductive voltages at these taps. With no quench situation there is no resistive voltage drop from tap to tap. The voltage from two successive taps are provided as differential inputs to respective isolation amplifiers A1 to A5. Thus, taps T1 and T2 supply inputs to amplifier A1, taps T2 and T3 supply inputs to amplifier A2, taps T3 and T4 supply inputs to amplifier A3, taps T4 and T5 supply inputs to amplifier A4, and taps T5 and T6 supply inputs to amplifier A5. Outputs from these amplifiers are provided to a processor circuit 44 which, in conjunction with signals on control line 30, govern operation of switches SW1 to SW3.

For some applications the total voltage drop across the inductor may reach thousands of volts, and accordingly the voltage between successive taps can approach a thousand volts or more. With no quench the two voltage inputs to each amplifier are separated by, for example, 1000 volts. For this condition the amplifier output does not exceed a predetermined threshold whereby switch SW3 would be activated. With a quench situation however, the loss of superconductivity at the quench location somewhere between two taps will cause a resistive voltage drop which may be in the order of only a few volts. The amplifiers therefore must be designed to be able to detect the presence of a few volts in perhaps a thousand volts. This requires special, and extremely expensive amplifiers.

Figure 3:
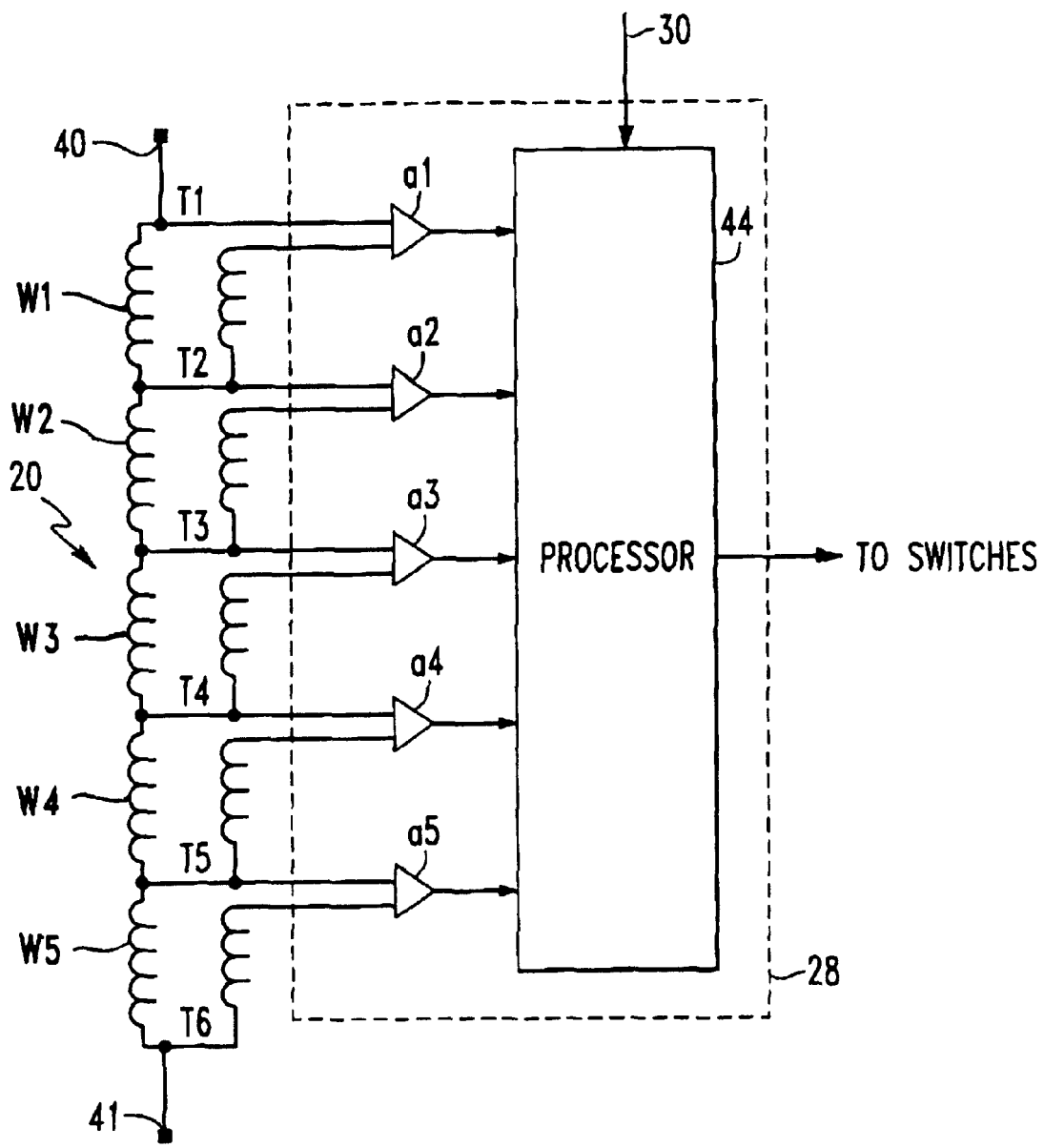
FIG. 3 illustrates an improved technique for obtaining voltage indications in a quench detection arrangement.

In order to obviate the requirement for these high voltage isolation amplifiers, the inductor may be provided with compensating windings, as illustrated in FIG. 3. Between each tap T1 to T6 is a respective compensating winding W1 to W5 each of which is of a normal, that is, non-superconducting material such as copper. The compensating winding experiences the same inductive voltages as the superconducting inductor, but not the resistive quench voltage. Essentially equal inductive voltages are provided as inputs to respective amplifiers a1 to a5, which accordingly, may now be relatively inexpensive devices needing only to detect the presence of a resistive low voltage quench in the presence of a theoretically zero inductive voltage differential (instead of a 1000 volt differential).

Various methods of incorporating the compensating windings include the wrapping of the inductor windings with a normal copper conductor. However, due to the presence of, for example, a coil form around which the cable is wound, interlayer insulators and reinforcing strapping, normally provided, it is impractical to merely wrap the copper conductor around the cable without disrupting the coil structure.

Another method of implementing the compensating winding is to provide the abovementioned interlayer insulator with a groove formed such as by a milling operation, and into which the compensating windings may be placed. This represents a time consuming and expensive operation.

Figure 4:
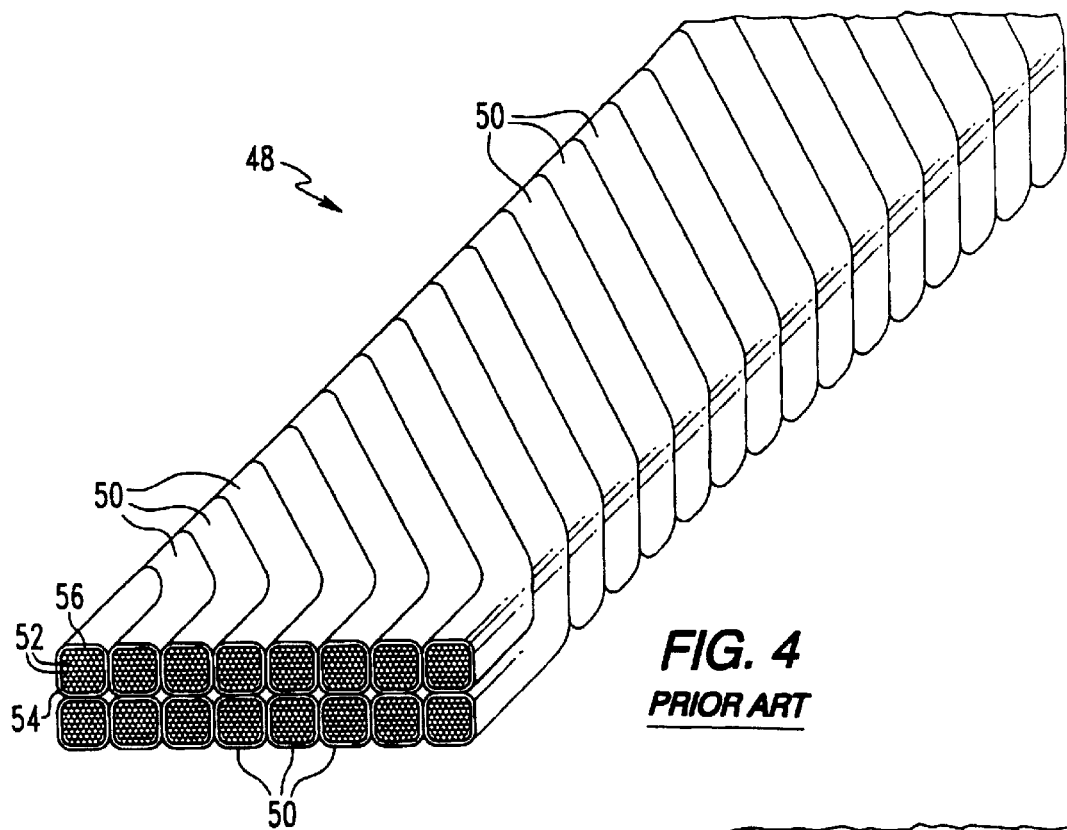
FIG. 4 illustrates a portion of a prior art superconducting cable useful for magnetic energy storage.

The present invention provides a unique solution to the problem and requires no additional coil preparation expenses. For example, FIG. 4 illustrates a conventional superconductive cable which may be formed into a superconducting inductor, as utilized herein. The cable 48 is a flat cable comprised of a plurality of superconducting strands 50, transposed to balance current distribution. Each strand includes a plurality of superconducting filaments 52, such as niobium-titanium, embedded in a copper matrix 54 and surrounded by a copper cladding 56.

Figure 5:
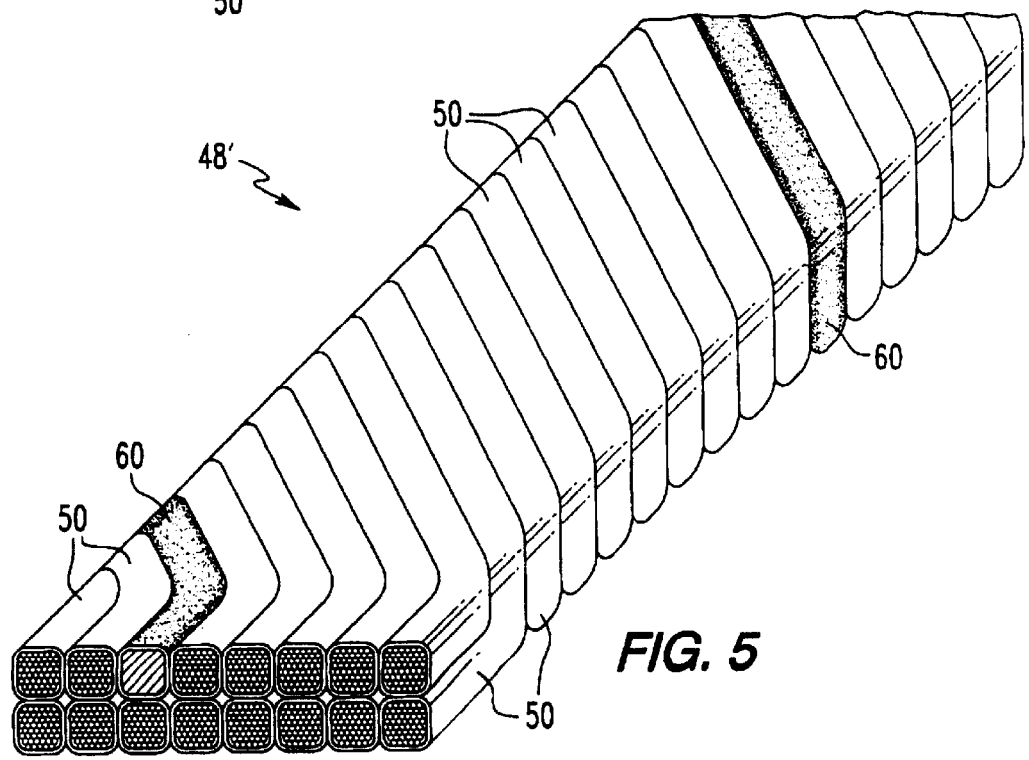
FIG. 5 illustrates a portion of an improved cable which is utilized in the present invention.

In the present invention, and as illustrated in FIG. 5, a superconducting cable 48' includes a compensating winding strand 60 integral with the cable. More particularly, one superconducting strand, which normally is a part of the cable, is replaced with the winding 60 which is of a non-superconducting material, such as copper 62, and which may include a jacket 64, of an electrically insulating material. This jacket 64 preferably is of a contrasting color so that the compensating winding 60 may be easily distinguished from the other strands. The winding 60 may then be cut at selected locations for electrical connection to the superconducting cable (at taps T1, T2 etc.) and to the amplifiers (a1, a2 etc.) of the quench detection and control circuit 28.

Figure 6:
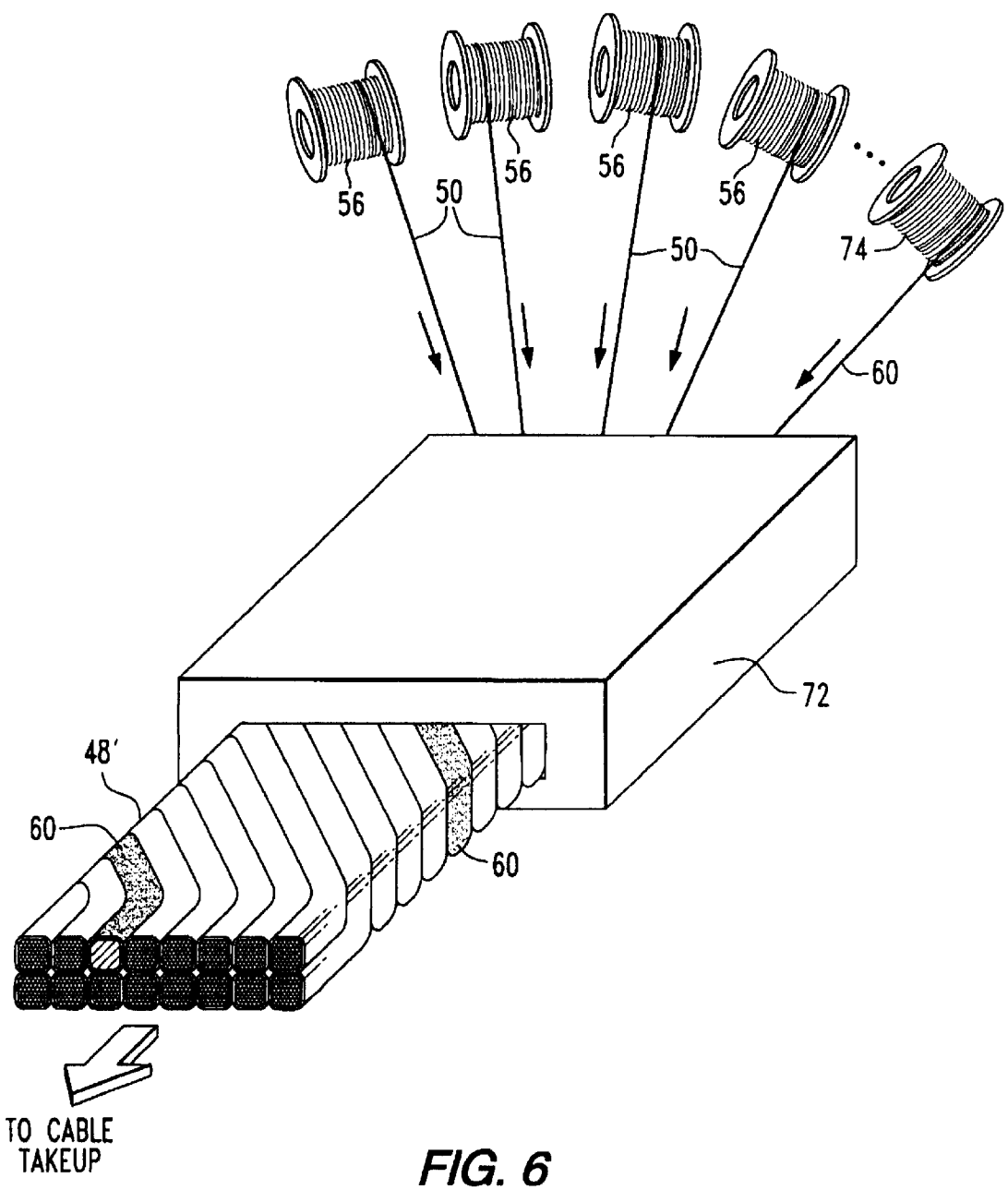
FIG. 6 is a representation of apparatus for producing the cable of FIG. 5.

FIG. 6 schematically illustrates the production of cable 48'. A plurality of spools 70 provide superconducting strands 50 to a cable winder 72 which includes conventional mandrel, rollers, dies, tensioners etc. for the production of a flat cable. Included with the apparatus is a spool 74 which provides a non-superconducting strand 60 which, when spliced into the superconducting cable at selected locations, will function as the compensating windings, as previously described. Cable 48' accomplishes this function without the disadvantages of having to machine separate grooves in a coil support structure or of winding a separate wire around an existing cable.

Although the present invention has been described with a certain degree of particularity, it is to be understood that various substitutions and modifications may be made without departing from the spirit and scope of the invention as defined in the appended claims.

What is claimed is:

1. An arrangement for use in the detection of quenches in superconducting coils, comprising:
    (A) a superconducting coil having a plurality of turns of superconducting cable;
    (B) said cable being comprised of a plurality of strands;
    (C) at least one of said strands being a non-superconducting wire, co-wound with the remainder of said strands;
    (D) said remainder of said strands being superconducting strands; and
    (E) quench detection means connected to said one non-superconducting strand and to said remainder of said strands at selected locations along said cable.
2. An arrangement according to claim 1 wherein:
    (A) said strands of said cable are transposed.
3. An arrangement according to claim 1 wherein:
    (A) said one non-superconducting strand is of a contrasting color to distinguish it from said remainder of said strands.
4. An arrangement according to claim 1 wherein:
    (A) said coil is an inductor in a superconducting magnetic energy storage system.

\* \* \* \* \*